3,320,183
ARYL-HYDROCARBON POLYMERS
Gordon P. Brown, Schenectady, N.Y., assignor to General Electric Company, a corporation of New York
No Drawing. Filed Feb. 1, 1962, Ser. No. 170,492
3 Claims. (Cl. 260—2)

This invention pertains generally to a new class of synthetic organic aryl-hydrocarbon polymers. More particularly, the invention pertains to a new class of solid aryl polymers having as the repeating unit an unsubstituted or substituted phenyl radical. Specifically, this invention pertains to a class of solid polyphenyls having a preponderance of repeating meta-oriented phenylene radicals, the polymers exhibiting unexpected thermal and oxidation resistance which makes them particularly suitable for a large number of applications not before open to synthetic organic materials.

Organic polymers which are stable at elevated temperatures of 300° C. and higher have been the goal of hereinbefore unsuccessful investigation. The primary interest has been in resinous polymers because of the ease with which such type compositions can be fabricated directly into a final shape for use. More particularly, thermoplastic resins can generally be dissolved in a suitable solvent or melted for application as films and the like, and thermoset resins can be molded into a desired final configuration, both type materials providing a final product directly from the resin with a minimum of processing steps. In addition to the ease and convenience of fabricating a final thermally resistant product from resins alone, certain solid structures including laminates, textiles, seals, and other objects contain resinous components as elements of the particular structure. Consequently, it would be of great value to provide a new class of resins having greater thermal durability together with such other desirable chemical and physical properties as to make the materials generally useful.

In certain applications, a suitable polymer retains functional utility even after undergoing substantial thermal degradation. To illustrate, there is present need for metal and textile coatings to serve as a thermal and oxidation barrier for protection of the substrate at exposure temperatures of 500° C. and higher. A useful resin for such application requires only integrity of the barrier layer which is possible even after substantial degradation of the resin assuming that sufficient carbonaceous residue remains. For the barrier layer to retain integrity requires a particular combination of physical and chemical properties including a carbon content which occupies more than 50% of both weight and volume of the resin, formation of low molecular weight gaseous products upon decomposition, and high decomposition temperatures. Integrity of a barrier layer will further be preserved upon degradation if the resin decomposition is not accompanied by substantial chain scission.

It is a primary object of the invention, therefore, to provide a new class of resinous polyphenyls which possess improved thermal durability.

It is still another important object of the invention to provide a new class of resinous polyphenyls which are characterized by solubility in general hydrocarbon solvents along with high melting points.

It is a still further important object of the invention to provide a new class of resinous polyphenyls wherein substantial change in solubility and melting point of the resin can be effected by variation in the method of resin preparation.

Still another important object of the invention is to provide novel methods for the preparation of resinous polyphenyls.

These and other important objects and advantages of the invention will be apparent from the detailed description which follows.

Briefly, the resinous polyphenyls of the invention comprise solid synthetic organic polymers having repeating unsubstituted or substituted benzene units with a bond between adjacent benzene units consisting of direct connection to the benzene nucleus at meta locations on the ring. Resins with the described structure are designated generically in the specification and claims as either "polyphenyls" or "polyphenylenes," both of which terms having been used commonly in the laterature to identify the general class of polymers. The chemical structure of the repeating benzene unit in the polymer can be further characterized by limitation of substitution to unoccupied meta positions on the ring with monovalent substituents selected from the group consisting of halogen and a phenoxy radical.

In one preferred embodiment of the invention a soluble high melting point linear homopolymer is prepared directly by condensation of the mono-Grignard product of a meta-oriented dihalogenobenzene in the presence of catalytic amounts of inorganic salts of heavy metals capable of existing in two or more oxidation states, including copper, nickel, iron, and cobalt. In a modified method of preparation, a mixture of the dihalogenobenzene with lesser proportions of a symmetrical tri-substituted halogenobenzene in the mixture is reacted by the recited procedure to yield a linear or branched polymer dependent upon the identity of the tri-substituted component and ratio of Grignard metal in the original reaction mixture.

A still different class of resinous meta-oriented polyphenyls is produced according to the invention through self-condensation of meta-oriented dihalogenobenzene by Wurtz reaction in an organic liquid solvent for the polymer containing equivalent amounts of sodium based on halogen content of the monomer. The polymeric products of the Wurtz reaction differ from the polymeric Grignard products with the former products having sufficient cross-linking between individual linear polymer chains to produce substantial insolubility and limited flow behavior. On the other hand, the Wurtz products cannot be characterized as devoid of resinous characteristics, since these polymers are moldable with pressure at temperatures around 300° C.

The preferred embodiments of the invention may be carried out as illustrated in the following examples and subsequent discussions thereon. Where parts and percentages appear hereinafter in the specification and claims, the reference is to parts and percentages by weight unless otherwise specified.

Example 1

A linear m-polyphenylene homopolymer was prepared by condensing the mono-Grignard of m-dibromobenzene in ether solution in the presence of catalytic amounts of ferric chloride. Accordingly, the mono-Grignard product was first obtained by mixing approximately 187 grams m-dibromobenzene (about ¾ of a mole) with approximately 18 grams of magnesium filings (about ¾ of a gram atom) and ethyl ether with stirring in a 2-liter, 3-neck flask fitted with a reflux condenser, dropping funnel, thermometer, and an inlet tube for a nitrogen protective atmosphere. The m-dibromobenzene was added dropwise with stirring and the temperature of the reaction mixture was maintained at approximately 30–35° C. during the addition by means of a water bath. The addition of the m-dibromobenzene was completed in approximately 3 or 4 hours whereupon the reaction mixture was heated at reflux for an additional 2 hours for complete formation of the mono-Grignard product. Approximately 3.2 grams of ferric chloride (about 0.02 mole) suspended in ethyl ether was then added to the reaction mixture cautiously to initiate the polymerization reaction giving rise to a vigorous exothermic reaction which necessitated cooling of the reaction mixture in an ice bath during catalyst addition. The exothermic polymerization reaction was maintained at a reflux temperature of approximately 50–60° C. for 1½ hours with continued stirring by adding approximately 250 milliliters of benzene to the reaction mixture. At the end of the polymerization period, no further reaction was observed and the reaction mixture was cooled to room temperature for hydrolysis and separation of the polymer product. Hydrolysis of the product was effected simply by adding approximately 100 milliliters of dilute mineral acid to the reaction mixture with stirring which resulted in substitution of a hydrogen atom for the mono-Grignard radical constituting one end-group of the polymer. The soluble hydrolyzed polymer was extracted from the reaction mixture with benzene and a solid product obtained by distilling off the benzene under a protective nitrogen atmosphere.

The separated homopolymer was a resinous solid having a flow point around 150–160° C. The chemical microanalysis of the polymer indicated approximately one bromine atom per molecule of polymer. Molecular weight determination of the polymer made by quantitative means based on halide end-groups resulted in a molecular weight value in the range of 1500–2200.

*Example 2*

Certain companion reactions utilizing the general method of condensing the mono-Grignard product of a dihalogenobenzene taught in the preceding example was conducted to demonstrate the effect of catalyst type and concentration upon the polymers produced. The presence of residual catalyst metal ions in a polymer tends to produce polymer degradation at temperatures of 300° C. and higher so that it is advisable not only to effect a clean separation of polymer from the reaction mixture but also to limit catalyst concentration in said mixture to the minimum effective amount. The two polymerization reactions which are described immediately following point out the lack of influence which increasing amounts of catalyst in the reaction mixture have upon the product produced so that suitable polymers of the invention are obtained with only catalytic quantities of catalyst in the polymerization mixtures.

Accordingly, the mono-Grignard product of m-dibromobenzene was formed in ether solution as described in Example 1 utilizing one mole of m-dibromobenzene with one gram atom of magnesium. Following the reaction of all magnesium, the solution was divided into approximately equivalent portions for separate polymerization reaction. One portion of the Grignard reaction mixture was added directly to a catalytic quantity of 1.39 grams of cobaltous chloride (0.01 molar $CoCl_2$) in 100 milliliters of benzene. The exothermic polymerization reaction initiated with the addition was maintained at approximately 72° C. by controlling the feed rate of Grignard product to the catalyst. Following the complete addition, polymerization was continued for 16 hours at the reflux temperature in an inert nitrogen atmosphere. Solvent was removed by distillation, and the solid polymeric residue was thereafter baked for approximately 24 hours on a steam bath. Hydrolysis of the residue to remove the Grignard end-group of the polymer was accomplished by first dissolving the polymer in a chlorobenzene solvent and thereafter acidifying the solution with a strong mineral acid. The hydrolysis was conducted in solution primarily to prevent additional entrainment of residual metal ions from the catalyst during treatment. The hydrolyzed product was separated from the reaction mixture in the usual fashion as described in Example 1. A solid linear polyphenyl was produced having a molecular weight as determined by cryoscopic examination of approximately 2500 with a melting point of about 275–290° C. Cryoscopic molecular weight determination is a routine analytical procedure which for the present type polymers involves the freezing point depression for a 1.0% by weight solution of the particular polymer in para-dibromobenzene. A second molecular weight examination determined by halide end-group analyses resulted in a molecular weight of approximately 2400 which correlates well with the value provided by cryoscopic examination.

The remaining portion of the original reaction mixture containing the mono-Grignard product of m-dibromobenzene was polymerized with a much larger concentration of the cobaltous chloride catalyst in the reaction mixture amounting to approximately equi-molar proportions of catalyst to mono-Grignard product in the mixture. Accordingly, a suspension of approximately 32.5 grams cobaltous chloride (0.25 mole $CoCl_2$) in 100 milliliters of benzene was added to the remaining portion of original reaction mixture and polymerization and hydrolysis and separation of the polymer formed, all as above described. A solid linear polyphenyl homopolymer was produced having a melting point of approximately 265–275° C. The molecular weight of the polymer product as determined by cryoscopic examination ranged between 1800–2500 with a corresponding molecular weight of approximately 2000 by halide end-group analysis.

The thermal stability of the above-prepared polymers was measured to determine any differences in behavior due to method of preparation. Routine thermogravimetric analyses were made from coarsely ground samples of each polymer product by heating the sample in a 000 Coors porcelain crucible on a Chevenard thermobalance at a heating rate of 180° C. per hour in a dry nitrogen atmosphere flowing at approximately 314 cc. per minute. The analysis was conducted in a temperature range from room temperature to approximately 900° C. with the results of the analyses expressed in percent weight loss of polymer for the particular material. While both polymer products underwent substantially equivalent total weight loss up to 900° C. of 37.5–38%, the product produced with only catalytic quantities of catalyst in the reaction mixture experienced only 7% weight loss up to 500° C. as compared with a 9% weight loss for the polymer prepared with equi-molar concentration of catalyst in the reaction mixture. The excellent thermal stability of a phenylene homopolymer generally is noted from these results with even improved performance obtained by preparation of the polymers according to the invention.

*Example 3*

To illustrate preparation of branched polyphenylene homopolymers characterized by branch phenyl groups which are para-oriented with respect to certain of the connecting bonds in the main polymer chain of repeating meta-oriented phenylene units, a dihalogenobenzene was condensed by Wurtz reaction with sodium. The self-condensation of a meta-oriented dihalogenobenzene was conducted in a 500 milliliter round-bottom, 3-neck flask fitted with a stirrer, dropping funnel, reflux condenser, thermometer, and nitrogen inlet tube. The reaction flask was charged with approximately 250 of diphenyl, sufficient benzene solvent to dissolve the dipenyl, and 23 grams (1 gram atom) sodium metal. The reaction mixture was heated to approximately 110° C. with vigorous stirring to break up the molten sodium into fine droplets, whereupon approximately 125 grams of (0.5 mole) m-dibromobenzene was added dropwise to the reaction mixture. The temperature of the reaction mixture was raised to 170–180° C. for about 30 minutes, whereupon exothermic polymerization was initiated with gradual rise in temperature of the reaction mixture to 245° C. The exotherm subsided after approximately 10 minutes, and the mixture was then heated at 160° C. for about 12 hours followed by additional heating at 220° C. for five more hours to complete the polymerization. The polymerized mixture was cooled, diluted with benzene and methanol added to destroy the excess sodium. The polymer solids were washed several times with methanol followed by water rinse to purify the product. The polymer yield as collected by filtration was 33 grams of cross-linked polyphenylene which proved insoluble in benzene, boiling chlorobenzene, nitrobenzene and para-dibromobenzene. Analysis of the polymer indicated a total absence of halogen and a molecular weight in excess of 15,000. Infrared spectra analysis detected the presence of small amounts of para-isomer in the polymer structure along with the predominant meta orientation.

*Example 4*

The general polymerization of Example 3 was repeated but employing sufficient benzene in the reaction mixture to maintain a reflux temperature of 95–100° C. throughout the polymerization. Polymerization was continued at this temperature for an additional period of six hours, whereupon no further reaction was observed to be taking place and the reaction mixture was then cooled to room temperature for hydrolysis and separation of the solid product which had formed during the reaction. After hydrolysis and separation of the product in the usual manner, six grams of solid material were isolated which could be swollen but not completely dissolved in benzene, chlorobenzene, or dibromobenzene. Halide analysis on the product indicated an average molecular weight of about 15,000, assuming one bromine atom per molecule of the polymer. Infrared spectra analysis indicated the characteristic presence of a small amount of para-isomer in the polymer. A slightly cross-linked polymer structure is observed from the low degree of solubility together with the melt behavior of the product. More particularly while a disk of the material was molded under the approximate conditions of 15,000 pounds pressure and 250° C., the material did not flow without aid of external pressure at temperatures below 300° C. The molded disk was submitted for routine thermogravimetric analysis which resulted in the total weight loss of 37% over the temperature range from room temperature to 900° C. An interesting result was the form stability exhibited by the polymer sample throughout the heat exposure as indicated by only slight dimensional changes in sample size after the test. Specifically, the disk had a diameter of 0.378 inch and a thickness of 0.107 inch before thermogravimetric analysis with a diameter of 0.299 and 0.108 inch thickness after analysis.

*Example 5*

Modification in the polymerization conditions of the preceding Examples 3 and 4 may be employed to vary the molecular weight of the slightly cross-linked branched phenylene polymers of the invention containing minor proportions of para-oriented phenyl units in the polymer side chains. In illustration, the Wurtz condensation polymerization above demonstrated was repeated using approximately 236 grams (1 mole) of m-dibromobenzene, 46 grams (2 gram atoms) of sodium, 400 grams of diphenyl, and 50 cc. of benzene for reaction. A mixture of the sodium, diphenyl and benzene was first heated to approximately 140° C. followed by dropwise addition of the m-dibromobenzene which initiated the polymerization, whereupon the temperature of the reaction mixture rose to above 150° C. exothermically during the course of the addition. Following a two-hour period of dropwise m-dibromobenzene addition, heating of the reaction mixture was continued for 24 hours at the 150° C. temperature to complete the polymerization. The polymerized mixture was cooled to room temperature which was followed by addition of benzene and methanol to the mixture for disintegration of the excess sodium catalyst. The solid product of polymerization was washed several times with methanol and water and thereafter isolated as a 50 gram quantity of resinous material. Molecular weight analysis of the product by halide end-group determination resulted in a value of approximately 7000 and infrared spectra again indicated the presence of a small quantity of para-isomer in the polymer. The thermoplastic nature of the polymer was indicated by incipient softening of the material at about 300° C.

Dielectric measurements from room temperature up to 240° C. were made on a disk of the above polymer molded at 315° C. and 35,000 lbs. per square inch pressure, in the same manner as described previously. The dimensions of the molded disk were a two-inch diameter with a thickness of 0.061 inch and silver electrodes were deposited on the major surfaces of the disk for volume resistivity, dielectric characteristics were determined at 60 cycles per The volume resistivity measurements were conducted with a Kiethley electrometer at 500 volts D.C. The remaining dielectric characteristics were determined at 60 cycles per second with a General Electric Schering bridge, at 1 kilocycle, 10 kilocycles, 20 kilocycles, with a Wayne Kerr type B–221 bridge, at 600 kilocycles and 1 megacycle with a Wayne Kerr type B–601 bridge. The results of the measurements over the mentioned temperature range are contained in the following table.

TABLE.—DISSIPATION FACTOR (PERCENT)

| Frequency: | 120° C. | 150° C. | 200° C. | 240° C. | 23° C. |
|---|---|---|---|---|---|
| 60 c.p.s. | 0.27 | 0.46 | | | *0.18 |
| 1 k.c. | 0.11 | 0.15 | 0.35 | 0.99 | *0.11 |
| 10 kc. | 0.07 | 0.09 | 0.15 | 0.28 | *0.13 |
| 20 kc. | 0.06 | 0.07 | 0.12 | 0.21 | *0.12 |
| 600 kc. | 0.22 | 0.19 | 0.25 | 0.25 | *0.36 |
| 1 mc. | 0.25 | 0.25 | 0.45 | | *0.45 |

DIELECTRIC CONSTANT

| Frequency: | 120° C. | 150° C. | 200° C. | 240° C. | 23° C. |
|---|---|---|---|---|---|
| 60 c.p.s. | 3.1 | 2.1 | 3.1 | 3.2 | 3.2 |
| 1 kc. | 3.1 | 3.1 | 3.1 | 3.1 | 3.2 |
| 10 kc. | 3.1 | 3.1 | 3.1 | 3.1 | 3.2 |
| 20 kc. | 3.1 | 3.1 | 3.1 | 3.1 | 3.2 |
| 50 kc. | 3.1 | 3.1 | 3.1 | 3.2 | 3.2 |
| 100 kc. | 3.1 | 3.1 | 3.1 | 3.2 | 3.2 |
| 600 kc. | 3.1 | 3.1 | 3.1 | 3.1 | 3.1 |
| 1 mc. | 3.1 | 3.1 | 3.1 | 3.1 | 3.1 |

VOLUME RESISTIVITY

| Ohm-cm | $4.9 \times 10^{14}$ | $6.2 \times 10^{12}$ | $1.5 \times 10^{12}$ | $2.3 \times 10^{11}$ | $1.4 \times 10^{16}$ |
|---|---|---|---|---|---|

*Measurements at 23° C. made after samples had been exposed to 50% relative humidity over a 48-hour period.

From these results it can be seen that the dielectric constant for polymers of the invention remains relatively constant over an appreciable temperature and frequency range. Likewise, the dissipation factor for the present materials undergoes only slight change with either temperature or frequency variation in the ranges measured. The dissipation factor measurements at 23° C. which were conducted after the sample had been subjected to appreciable moisture exposure further indicate little moisture sensitivity for the polymers of the invention. While the volume resistivity measurements indicate some lowering of resistance with temperature increase, excellent dielectric behavior of the material is still exhibited at 240° C. Summarizing the dielectric characteristics for polymers of the invention, it can be noted that the materials provide a durable barrier to the passage of electrical current under a great variety of adverse conditions including moisture contamination and in air exposure at elevated temperatures.

*Example 6*

To illustrate still different polymer structures of the invention, mono-Grignard products of a mixture comprising a major proportion of a m-dihalogenobenzene with minor proportions of a symmetrical trihalogenobenzene in the mixture were condensed according to the general method hereinbefore described to produce branched polymers having a predominance of unsubstituted repeating phenylene units linked at the meta positions between adjacent units while also containing branch chains of phenyl units appended to the benzene nucleus in the main chain at ring sites which are meta-oriented with respect to the main chain connecting bonds. The branched polymers are thermoplastic or infusible in nature dependent primarily upon the amount of branching which in turn is controlled by the relative proportion of trihalogenobenzene or ratio of Grignard metal to monomer in the polymerization mixture. In greater explanation, as the relative proportion of trihalogenobenzene monomer in the reaction mixture increases, there is greater branching of the polymer which has a tendency to produce a more highly cross-linked polymerization product. The effect of Grignard metal concentration in the reaction mixture on the type product formed will be more fully described in later appearing examples of this specification.

A polymer was prepared employing the general method of preparation described in Example 1 wherein a mono-Grignard product was formed in an anhydrous solvent mixture of ether and benzene containing approximately 0.5 mole of m-dibromobenzene, 0.05 mole of symmetrical tribromobenzene, and 0.575 mole of magnesium. Polymerization of the mono-Grignard product was initiated by adding approximately two mole percent cobaltous chloride to the reaction mixture together with approximately 100 grams diphenyl and followed by distilling off the ether solvent. The polymerization mixture was next heated for approximately 12 hours at a reflux temperature of 150° C. to complete the reaction, thereafter cooled to room temperature, and poured into benzene. The polymerized mixture containing the still soluble product was thereupon washed and dried, concentrated by distillation to approximately 50–75 cc. volume and the concentrate added methanol in order to precipitate the branched polyphenylene product. Added purification of the polymer product was obtained by further solution in benzene, filtration, and precipitation with methanol.

The separated resin softened at approximately 195° C. and flowed at about 225° C. Analysis of the polymer for molecular weight yielded 4% bromide corresponding to a bromine equivalent weight of about 2000.

Example 7

A branched polymer with a lesser number of side chains per polymer molecule than the product of Example 6 was prepared as generally described in the said example but substituting a smaller mole ratio of magnesium to total monomer in the reaction mixture. In further explanation, the ratio of magnesium in the reaction mixture of Example 6 is one mole of magnesium per two equivalents of bromine, whereas for the present example, the ratio is one mole of magnesium per mole of total halogenobenzene resulting in the ratio of magnesium to bromine in the reaction mixture being one mole of magnesium to 2.1 equivalents of bromine in the mixture. The decreased ratio of magnesium in the reaction mixture for the present example results in the presence of fewer phenyl side chains in the polymer.

Accordingly, a mono-Grignard product was prepared as previously described in an anhydrous ether-benzene solvent mixture containing 0.835 mole m-dibromobenzene, 0.083 mole of symmetrical tribromobenzene, and 0.918 mole of magnesium. Polymerization of the mono-Grignard product was accomplished as described in Example 6, except that the reaction was conducted for a total time of 6 hours at 150° C. as compared to a 16-hour polymerization period in the said example. A solid branched polymer was obtained in approximately 50% yield having a softening temperature at approximately 185° C. and a flow temperature of about 235° C. Analys is of the polymer molecular weight yielded a 2.7% bromine content for a bromine equivalent weight of approximately 2850.

Example 8

A branched polyphenylene was prepared as described in preceding Example 6 utilizing a different di-substituted halogenobenzene to illustrate preparation of still other polymers within contemplation of the invention.

A Grignard product was prepared by the same general method of the preceding examples from a mixture obtained by adding 0.05 mole symmetrical tribromobenzene dissolved in anhydrous benzene to 0.5 mole of 1-chloro-3-bromobenzene dissolved in an equi-part ether solution with resulting admixture being added dropwise to 0.575 mole magnesium. The reaction mixture was refluxed approximately 4½ hours for complete reaction of the magnesium to form the mono-Grignard product. Polymerization of the Grignard product was initiated by addition of 5 grams (about 8 mole percent) anhydrous cobaltous chloride suspended in benzene to the reaction mixture with further refluxing of the mixture at 65° C. for approximately 12 hours. Approximately 100 grams diphenyl was thereafter added to the polymerization mixture and the ether in the mixture distilled off whereupon the mixture was further heated at 150° C. for another 8 hours and at 150–200° C. for 16 hours to complete the polymerization reaction. The polymerized mixture was then cooled to room temperature, diluted with benzene, and washed with aqueous hydrochloric acid whereupon the organic phase separated. The dissolved polymer was collected from solution by adding the organic phase portion of the mixture to methanol. Following further solution of the polymer in benzene and reprecipitation with methanol for added purification, the solid product was collected in the usual fashion. The branched polymer had approximately 1.7% halogen content calculated as bromide ion for a halide equivalent weight of around 5000. The polymer softened at 160° C. and flowed at 195° C. Polymer yield was approximately 65%, based on infinite polymer length and neglecting end-groups.

Example 9

A still different linear polyphenylene having a predominance of the repeating meta-oriented phenylene units but also containing occasional phenoxy substituents appended to the benzene nucleus at a meta ring site with respect to the connecting bonds between repeating units may be prepared by condensation of the mono-Grignard product as hereinbefore described. More particularly, the mono-Grignard product of a mixture comprising a meta-oriented di-halogenobenzene with a 3,5-dihalogenophenyl phenyl ether are condensed by the general method of Example 1 to provide a polymer having the type structure described. Thus, 0.5 mole of m-dibromobenzene, 0.05 mole of 3,5-dibromophenyl phenyl ether, and 0.55 mole of magnesium were reacted to form the mono-Grignard product in the usual manner in anhydrous ether solvent. Polymerization proceeded regularly after the addition of approximately two mole percent anhydrous cobaltous chloride. Diphenyl was added and the ether distilled off after which the reaction was continued at 180° C. for approximately 8 hours to complete the polymerization. A solid polymer was obtained from the polymerized mixture in the usual fashion in an amount constituting approximately 50% of theoretical yield. The polymer softened at approximately 135° C. and melted at 172° C. A bromine analysis of the polymer yielded 4.6% bromine content for a bromine equivalent molecular weight of approximately 1700. Additional molecular weight determination of the polymer product by conventional vapor pressure osmometry technique resulted in a molecular weight value of approximately 2300 which is in close agreement with the halide end-group analysis measurement.

The products of the invention are solid resinous polyphenyls (polyphenylenes) which may be characterized generally by a predominance of repeating phenylene units linked together through bonds at the meta position of the benzene nucleus between adjacent phenylene units. The structure of the polymer may be represented simply as follows:

where *n* is an integer of indeterminate value since the resinous products are mixtures of different chain lengths and ordinary means of determining molecular weight give an average value. For polymers of the invention with a low molecular weight, *n* is an average of from about 20–40, while for higher molecular weight resins having molding and film-forming properties, the average value of *n* is approximately 100–200 and greater. The present polymers are distinguishable from other meta-oriented polyphenyls previously made, for example, by catalytical reduction of halo-benzenes using palladium on calcium carbonate as disclosed by Busch and Weber. The cited method involves a seven-step mechanism which is too complex for efficient preparation and yields low molecular weight crystalline materials having up to about 16 phenyl units which are distinct from the resinous materials of the invention. Furthermore, there is doubt that the cited method produces higher molecular weight materials since the identity of the higher members in the series were doubtful.

Polymers of the invention also differ in other important properties from the reported crystalline polyphenyl compounds depending upon whether the polymer is a Grignard product or Wurtz product. The Grignard products generally exhibit true thermoplastic behavior of solubility in common organic solvents and melting points below 300° C. at molecular weights of at least three times the molecular weight of crystalline sedeciphenyl which is an insoluble compound with a reported melting point of 321° C. On the other hand, while the Wurtz products of the invention exhibit limited solubility being only swellable in the common organic solvents, the polymers are fusible at temperatures below 300° C. by exercise of external pressure. The deformability of the Wurtz polymers is characteristic of an amorphous resinous material as distinct from the flow characteristices for a crystalline compound which can result in fracture under deforming pressures at temperatures significantly below the melting point of the compound.

Especially preferred Wurtz products generally exhibit greater thermal stability at temperatures up to 900° C. than the lower molecular weight Grignard products. The preferred products may also be distinguished from the soluble linear class of mono-Grignard condensates of a meta-dihalogenobenzene in chemical structure by reason of the presence of small amounts of para-isomer generally detected in the preferred products. More particularly, infrared spectra analysis made on both type polymers has indicated absorption both in the 12.1 micron para region and also in the 12.65 meta region for the Wurtz products compared to only meta absorption for the Grignard products. The infrared analysis on the Wurtz products uniformly resulted in an intensity of absorption at the para region only one-fifth or less than that of absorption at the meta region. The infrared spectra and other behavior characteristics of the Wurtz products indicate an idealized structural configuration for the polymers as follows:

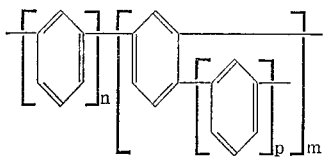

wherein *n*, *p*, and *m* are all integers, with *n* having a greater value than *m*, and *p* having a value greater than 1. In the structural formula it is noted that a branched polymer is disclosed having *p* number of repeating phenylene units appended to a benzene nucleus in the main polymer chain at a site ortho to one bond connecting the benzene nucleus in the main chain and para to the remaining bond connecting said benzene nucleus in the chain.

Other preferred branched and unbranched polyphenylenes may be prepared according to the invention by condensing Grignard products of mixtures comprising a meta-dihalogenobenzene with certain symmetrical meta-trisubstituted benzenes selected from the group consisting of 1,3,5-trihalogenobenzene and 3,5-dihalogenophenyl phenyl ether wherein the meta-dihalogenobenzene is the major constituent in the mixture. Linear or branched polymers are formed from the mixture depending primarily upon the molar ratio of Grignard metal to the total substituted benzene in the mixture, excluding those mixtures containing 3,5-dihalogenophenyl phenyl ether which form a substituted rather than a branched polymer. A primarily linear resinous polyphenyl is formed if an anhydrous mixture containing a meta-dihalogenobenzene, a symmetrical trihalogenobenzene, and the Grignard metal having a molar ratio of approximately one mole Grignard metal per mole of total halogenobenzene in the mixture is reacted to form the mono-Grignard product with subsequent condensation of the product to form the polymer. On the other hand, a primarily branched polymer is prepared if the anhydrous mixture containing a metadihalogenobenzene, a symmetrical trihalogenobenzene, and the Grignard metal has a molar ratio of approximately one mole Grignard metal per two equivalents of total halogen in the mixture. The solid substantially linear polymers prepared from the substituted benzene mixtures above described can be represented by the structural formula

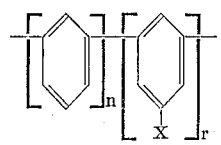

wherein *x* is a monovalent substituent selected from the group consisting of halogen and a phenoxy radical, and wherein *n* and *r* are both integers with *n* having a greater value than *r*. The solid resinous branched polymers prepared from the other substituted benzene mixtures above described can also be represented by the following structural formula

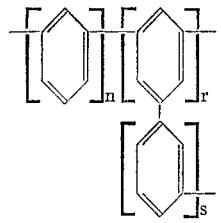

wherein *n*, *r*, and *s* are all integers, with *n* having a greater value than *r*, and *s* having a value of at least 1. The solid linear polymer prepared from a mixture of the meta - dihalogenobenzene with 3,5 - dihalogenophenyl phenyl ether can be specifically represented by the structural formula

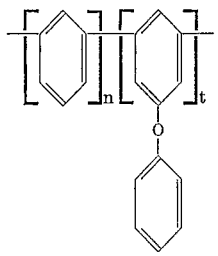

wherein $n$ and $t$ are both integers, with the ratio $n/t$ being varied according to the ratio of starting monomers. The branched polymers as prepared from the modified Grignard procedure described can be distinguished from the branched Wurtz condensation products in certain important respects involving both structural differences and behavior characteristics. As will be noted from the structural formula for the above branched Grignard condensation products, the only orientation in the polymers is that of meta orientation as distinct from the para orientation depicted structurally and confirmed by infrared analysis for the Wurtz condensation products. Important behavior differences between branched Wurtz products and branched Grignard products of the invention include generally lower melting points and greater solubility for the latter materials.

From the foregoing description, it will be apparent that a novel class of meta-oriented polyphenyls characterized by increased thermal stability at elevated temperatures has been provided together with novel methods for the preparation of these compositions. It is not intended to limit the invention to the preferred embodiments above shown, however, since it will be obvious to those skilled in the art that certain modifications of the present teaching can be made without departing from the true spirit and scope of the invention. For example, while specific examples of only bromo- and chloro-substituted dihalogeno-benzenes were illustrated in the above examples, the iodo- and fluoro-substituted benzenes may also be utilized for the preparation of the polymers. Likewise, it may be possible to prepare polymers of the invention with additional substituents on the repeating phenylene units if the added substituents are of sufficient unreactivity so as not to sterically hinder or otherwise interfere in the condensation reaction. It is intended to limit the present invention, therefore, only to the scope of the following claims.

What I claim as new and desire to secure by Letters Patent of the United States is:

1. Solid copolymers consisting essentially of material having the structural formula

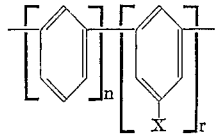

wherein $x$ is a monovalent halogen substituent and $n$ and $r$ are both integers with $n$ having a greater value than $r$.

2. Solid resinous branched polymers consisting essentially of material having the structural formula

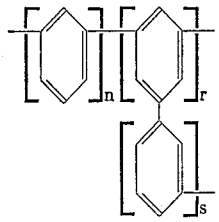

wherein $n$, $r$, and $s$ are all integers with $n$ having a greater value than $r$ and $s$ having a value of at least 1.

3. Solid resinous polymers consisting essentially of material having the structural formula

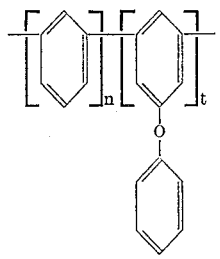

wherein $n$ and $t$ are both integers, and wherein the ratio $n/t$ is varied according to the ratio of starting monomers.

References Cited by the Examiner
UNITED STATES PATENTS
3,082,177  3/1963  Anderson _____ 260—2
3,159,589  12/1964  Bloomfield et al. _____ 260—2

FOREIGN PATENTS
517,738  1/1939  Great Britain.

OTHER REFERENCES
Busch et al.: "Journal für Praktische Chemie," vol. 146, Aug. 12, 1936, pp. 9–10 and 30–35.

Goldschmiedt: "Monatshefte für Chemie," vol. 7, 1886, pp. 40–47.

Shvartsberg et al.: "Russian Chemical Review," vol. 29, December 1960, pp. 668–9.

References Cited by the Applicant
Journal of Chem. and Eng'rg. Data 6, No. 1, pp. 125–7, January 1961, JACS, 82, 5227 (1960).

SAMUEL H. BLECH, *Primary Examiner.*

MURRAY TILLMAN, LEON J. BERCOVITZ,
*Examiners.*

H. D. ANDERSON, *Assistant Examiner.*